United States Patent
Masui et al.

(10) Patent No.: US 6,227,068 B1
(45) Date of Patent: May 8, 2001

(54) BICYCLE CONTROL DEVICE HAVING A ROTATABLE DIAL

(75) Inventors: Takuji Masui; Takeo Abe, both of Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 08/991,255

(22) Filed: Dec. 16, 1997

(30) Foreign Application Priority Data

Dec. 19, 1996 (JP) .................................................. 8-354344

(51) Int. Cl.[7] .................................................. B62M 9/00
(52) U.S. Cl. .................................. 74/473.3; 200/61.85
(58) Field of Search ...................... 74/488, 489, 473.13, 74/473.14, 473.28, 18, 502.2; 116/28.1; 340/456, 432, 3; 200/61.85, 61.88, 11 R, 12, 11 A, 11 D, 11 G; 318/543; 324/207.25, 207.2; 335/205; 474/80; 280/260

(56) References Cited

U.S. PATENT DOCUMENTS

| | | | |
|---|---|---|---|
| 3,965,763 | * 6/1976 | Wechsler | 74/489 X |
| 4,065,983 | * 1/1978 | Mimura | 474/80 |
| 4,541,500 | * 9/1985 | Gelhard | 180/205 |
| 4,859,984 | 8/1989 | Romano | 340/432 |
| 5,042,314 | * 8/1991 | Rytter et al. | 74/335 X |
| 5,059,158 | * 10/1991 | Bellio et al. | 474/80 |
| 5,161,422 | * 11/1992 | Suman et al. | 74/335 |
| 5,178,033 | * 1/1993 | Kund | 74/502.2 X |
| 5,186,071 | * 2/1993 | Iwasaki | 74/489 |
| 5,261,858 | 11/1993 | Browning | 474/69 |
| 5,370,412 | 12/1994 | Chou | 280/288.4 |
| 5,483,137 | 1/1996 | Fey et al. | 318/560 |
| 5,551,315 | 9/1996 | Pikoulas | 74/502.2 |
| 5,569,104 | * 10/1996 | Bellio et al. | 474/70 |
| 5,676,020 | * 10/1997 | Jordan et al. | 74/475 |

FOREIGN PATENT DOCUMENTS

| | | | |
|---|---|---|---|
| 196 42 906 A1 | 4/1997 | (DE) | B62K/23/06 |
| 0 566 025 A1 | 10/1993 | (EP) | B62M/25/08 |

* cited by examiner

Primary Examiner—David A. Bucci
Assistant Examiner—Colby Hansen
(74) Attorney, Agent, or Firm—James A. Deland

(57) ABSTRACT

A bicycle control device includes a base member adapted to be mounted to a structural member of a bicycle, a dial rotatably mounted to the base member, a detent mechanism operatively associated with the dial for providing a detenting force to the dial at a plurality of rotational positions of the dial, and a first electrical contact member operated by the dial for selectively electrically communicating with a second electrical contact member when the dial is positioned at each of the plurality of rotational positions. A button and/or display may be disposed in proximity to the dial to allow the rider to control the bicycle transmission and to view the status of the selected gears, respectively.

54 Claims, 2 Drawing Sheets

BICYCLE CONTROL DEVICE HAVING A ROTATABLE DIAL

BACKGROUND OF THE INVENTION

The present invention is directed to bicycle control devices and, more particularly, to a bicycle control device that includes a rotatable dial that may be manipulated by the rider's hand.

Some bicycles that have been proposed feature the use of an automatic shifter, whereby bicycle shifting is managed by an electric motor, actuator, or the like, and automatic shifting is managed on the basis of detected data such as the bicycle speed, the torque applied to the crank spindle, and the like. The automatic shifting of such automatic shifters should have a plurality of automatic shifting modes, such as an automatic shifting mode for flat terrain and an automatic shifting mode for uphill terrain. This is because the optimal shift timing varies depending on the incline of the road, the operator leg power, and the like. It is also sometimes necessary to switch from automatic shifting mode to manual shifting mode.

In the past, a lever type of switch has been used to switch between the plurality of shifting modes. However, because conventional lever types of switches protrude, there is a risk that gears will be shifted by unintentional operation of the lever. Particularly on extremely rough roads, there is considerable potential for the operator's hand to inadvertently strike the lever, resulting in unintended shifting.

SUMMARY OF THE INVENTION

The present invention is directed to a control device for a bicycle whereby shifting modes and the like are reliably switched by the operator at a location that is readily at hand, with less potential for accidental switching. In one embodiment of the present invention, a bicycle control device includes a base member adapted to be mounted to a structural member of a bicycle, a dial rotatably mounted to the base member, a detent mechanism operatively associated with the dial for providing a detenting force to the dial at a plurality of rotational positions of the dial, and a first electrical contact member operated by the dial for selectively electrically communicating with a second electrical contact member when the dial is positioned at each of the plurality of rotational positions. The switch may provide electrical signals for controlling a plurality of bicycle transmission shift modes. A button and/or display may be disposed in proximity to the dial to allow the rider to control the bicycle transmission and to view the status of the selected gears, respectively.

DETAILED DESCRIPTION OF THE EMBODIMENTS

Figure 1:
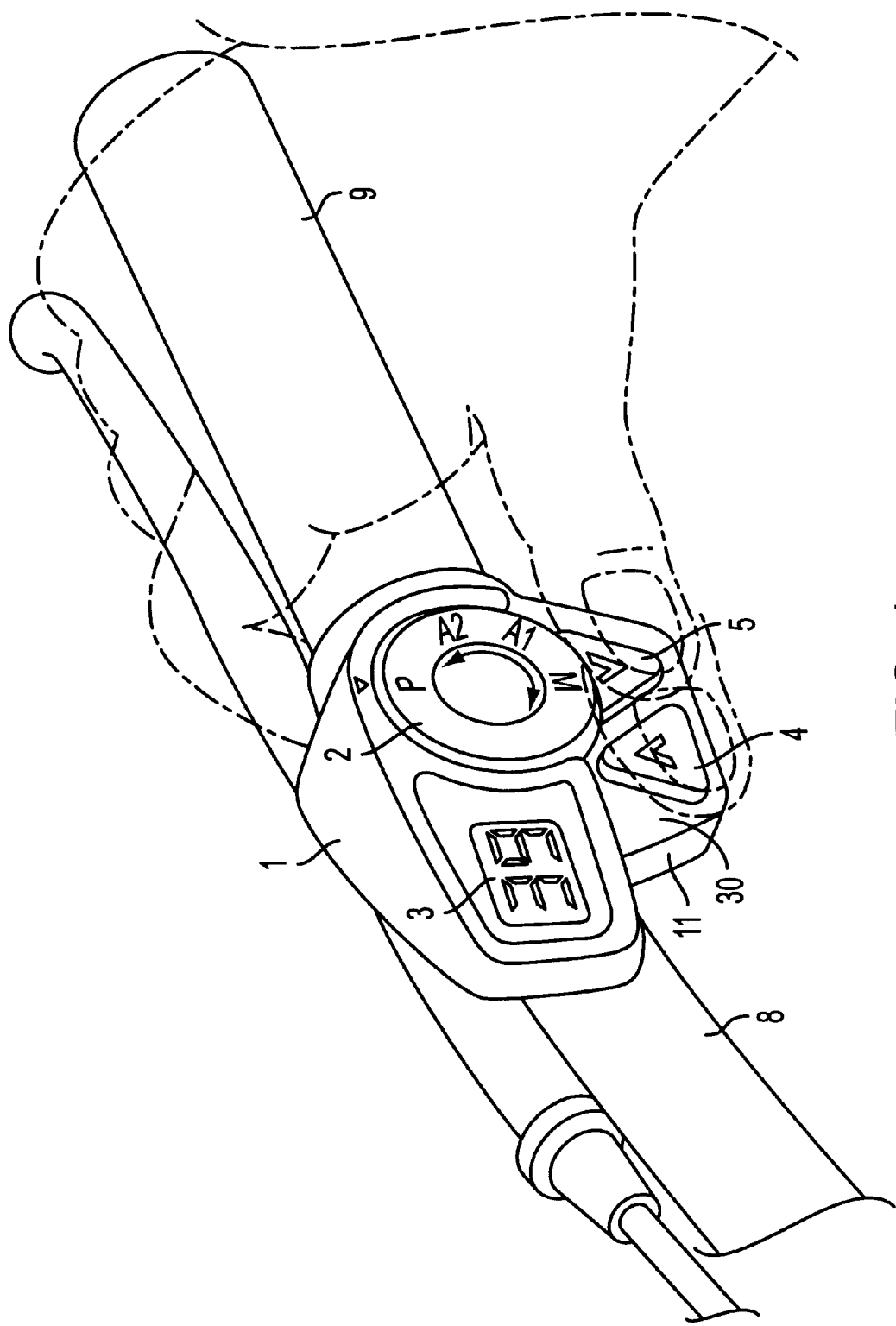
FIG. 1 is a perspective view of a particular embodiment of a bicycle control device according to the invention mounted to a handlebar.

FIG. 1 is a perspective view of a particular embodiment of a bicycle control device according to the invention mounted to a handlebar 8. As shown in FIG. 1, a switch 1 is provided at a location adjacent to the right hand grip 9 of the bicycle handlebar 8. The switch 1 is provided with a generally circular rotatable rotating dial 2. The bottom of the rotating dial 2 can be rotated by the thumb of the right hand to switch positions. The outer peripheral edge of the rotating dial 2 has a slight texture to enhance friction force.

The switching positions of the rotating dial 2 include a manual shift mode M, a first automatic shift mode A1, a second automatic shift mode A2, and a park mode P. Each mode letter should line up with the downward facing triangle mark at the top of the switch 1. A clicking sensation produced by a detent mechanism described below is produced at each switch position, allowing switching operations to be confirmed.

No automatic shifting is performed in manual shift mode M. Instead, manual shifting is managed with an up shift button 4 and a down shift button 5, both of which extend perpendicular to an outer surface 30 of a top cover 11. The first automatic shift mode A1 is for automatic shifting on flat terrain. The shift timing is calculated on the basis of detected data such as the bicycle speed and the torque applied to the crank spindle, and the shifting operations are performed automatically by an electric motor, actuator, or the like. Shifting can also be done manually at the same time by operating the up shift button 4 and down shift button 5. The second automatic shift mode A2 is for automatic shifting on uphill terrain. In this mode, the shift operations shift to a lower speed side than the first automatic shift mode A1. Park mode P locks and prevents the drive wheel from rotating. The bicycle can be parked in a stable manner, even when parked on inclined terrain or sloped roads, because the drive wheel is locked. While the bicycle is running, that is, while the drive wheel is turning, a safety function prevents the drive wheel from becoming locked if the rotating dial 2 should inadvertently be set to park mode P.

The switch 1 is provided with a display means 3. The shift position of the front change gear device is displayed on the left side of the display means 3, and the shift position of the rear change gear device is displayed on the right side. The current shift state can be seen at a glance on the display means 3. Liquid crystal display panels, light-emitting diodes, and the like can be used as the display means 3.

Figure 2:
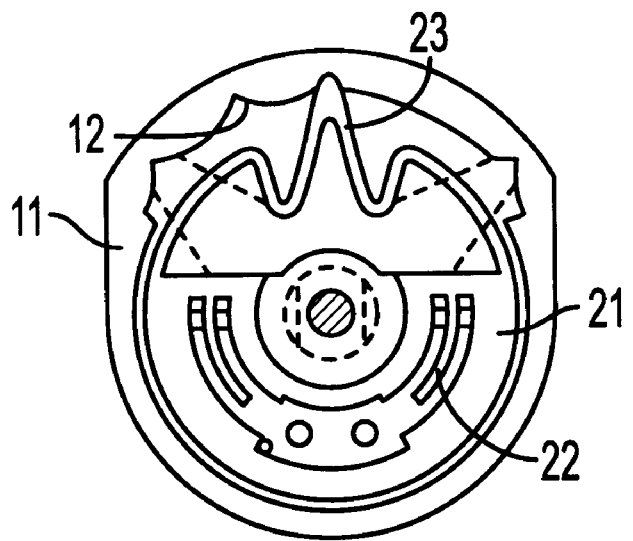
FIG. 2 is a view taken along line II—II in FIG. 3.
Figure 3:
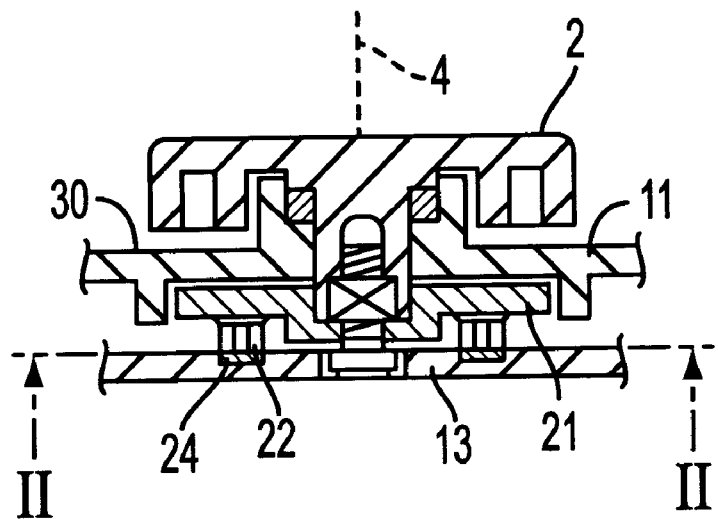
FIG. 3 is a cross sectional view of a particular embodiment of the dial and electrical contacts used in the bicycle control device shown in FIG. 1.

FIGS. 2 and 3 depict the internal structure of the switch 1. The rotating dial 2 and a brush platform 21 are locked by a screw and rotate together around a rotational axis X that is perpendicular to outer surface 30 of top cover 11 as well as to the handlebar as should be apparent from FIG. 1. A first electrical contact member in the form of a brush 22 consisting of a conductive material is fixed to the brush platform 21, and an electrical connection is made with a second electrical contact member 24 provided on a base plate 13. The first and second electrical contact members selectively communicate according to the rotating position of the rotating dial 2.

An elastic convex component 23 is provided on one side of the brush platform 21. The brush platform 21 and the elastic convex component 23 are integrally formed of resin. In the top cover 11, at positions facing the elastic convex component 23, concave components 12 are provided in a plurality of locations corresponding to the plurality of switching positions of the rotating dial 2. The elastic convex component 23 fits into a concave component 12, thus forming the detent mechanism which produces a detenting force to the rotating dial 2. The detenting force guides the rotating dial 2 into the various switching positions and ensures reliable switching operations.

Since switching operations are effected by the rotating dial as described above, there are no protruding parts such as levers, thus reducing the potential for unintended operation of the control device While the above is a description of various embodiments of the present invention, further modifications may be employed without departing from the spirit and scope of the present invention. For example, the size, shape, location or orientation of the various components may be changed as desired. The functions of one element may be performed by two, and vice versa. In the aforementioned embodiment, the switch is used to switch shift modes, but it can also be used for other switching operations such as turning a light on and off, or switching the modes of a bicycle display device. The switch display means can be used for displays other than the shift position, such as the running speed, distance traveled, or the like. In such cases, a display switch button that switches the display on the display means should be provided. Thus, the scope of the invention should not be limited by the specific structures disclosed. Instead, the true scope of the invention should be determined by the following claims.

What is claimed is:

1. A bicycle control device comprising:

a base member adapted to be mounted to a structural member of a bicycle;

a dial rotatably mounted to the base member so that the dial rotates around an axis substantially perpendicular to an outer surface of the base member, and so that the dial at least partially overlaps the structural member when viewed from a top of the dial along the axis;

a manually operated button disposed on the base member in proximity to the dial;

a detent mechanism operatively associated with the dial for providing a detenting force to the dial at a plurality of rotational positions of the dial; and a first electrical contact member operated by the dial for selectively contacting a second electrical contact member when the dial is positioned at each of the plurality of rotational positions.

2. The device according to claim 1 wherein the first and second electrical contact members provide electrical signals for controlling a plurality of bicycle transmission shift modes.

3. The device according to claim 2 wherein the base member and rotatable dial include markings indicating:

a manual operation shift mode;

an automatic shift mode; and a park mode.

4. The device according to claim 3 wherein the markings indicating the automatic shift mode includes markings indicating:

a first automatic shift mode; and a second automatic shift mode.

5. The device according to claim 1 further comprising:

display means disposed in proximity to the dial for displaying alphanumeric information.

6. The device according to claim 5 wherein the display means comprises an electrical display.

7. The device according to claim 1 further comprising:

display means disposed in proximity to the dial for displaying alphanumeric information.

8. The device according to claim 7 wherein the display means comprises an electrical display.

9. The device according to claim 1 wherein the first electrical contact member comprises a conductive brush that rotates with the dial.

10. The device according to claim 1 further comprising:

a cover having a plurality of concave components formed on an inner peripheral surface thereof;

an elastic convex component that rotates with the dial for selectively engaging the plurality of concave components; and wherein the plurality of concave components and the elastic concave component form the detent mechanism.

11. The device according to claim 10 wherein the dial is disposed on a first side of the cover and the elastic convex component is disposed on an opposite second side of the cover.

12. The device according to claim 1 further comprising:

a cover, wherein the dial is disposed on an external first side of the cover;

a platform disposed on an opposite second side of the cover and connected to the dial for rotation therewith; and a conductive brush disposed on the platform for forming the first electrical contact member.

13. The device according to claim 12 wherein the cover includes a plurality of concave components formed on an inner peripheral surface thereof, wherein the platform includes an elastic convex component for selectively engaging the plurality of concave components, and wherein the plurality of concave components and the elastic convex component form the detent mechanism.

14. The device according to claim 13 further comprising:

display means disposed in proximity to the dial for displaying alphanumeric information.

15. The device according to claim 14 wherein the display means comprises an electrical display.

16. The device according to claim 13 further comprising:

display means disposed in proximity to the dial for displaying alphanumeric information.

17. The device according to claim 16 wherein the display means comprises an electrical display.

18. The device according to claim 1 further comprising a handlebar, wherein the base member is mounted to the handlebar in proximity to a hand grip of the handlebar so that the dial at least partially overlaps the handlebar when viewed from the top of the dial along the axis.

19. The device according to claim 1 wherein an entire upper surface of the dial is substantially flat.

20. The device according to claim 1 wherein the dial has an upper peripheral surface surrounding the axis so that the dial is operated by contacting the upper peripheral surface with a thumb and sweeping the upper peripheral surface contacted by the thumb around the rotational axis so that the upper peripheral surface moves around the rotational axis.

21. The device according to claim 20 wherein the upper peripheral surface has an annular shape.

22. The device according to claim 21 wherein the upper peripheral surface has a free circular outer edge.

23. A bicycle control device comprising:

a base member adapted to be mounted to a structural member of a bicycle;

a dial rotatably mounted to the base member;

a detent mechanism operatively associated with the dial for providing a detenting force to the dial at a plurality of rotational positions of the dial;

a first electrical contact member operated by the dial for selectively contacting a second electrical contact member when the dial is positioned at each of the plurality of rotational positions;

a cover, wherein the dial is disposed on an external first side of the cover;

only a single platform disposed on an opposite second side of the cover and connected to the dial for rotation therewith; and a conductive brush disposed on the platform for forming the first electrical contact member.

24. The device according to claim 23 wherein the dial has a disk shape.

25. The device according to claim 23 wherein the platform is disposed immediately adjacent to the cover.

26. A bicycle control device comprising:

a base member adapted to be mounted to a structural member of a bicycle, wherein the base member includes a top cover having an outer surface;

a dial rotatably mounted to the base member so that the dial rotates around a rotational axis perpendicular to the outer surface of the top cover;

wherein the dial has an upper peripheral surface surrounding the rotational axis so that the dial is operated by contacting the upper peripheral surface with a thumb and sweeping the upper peripheral surface contacted by the thumb around the rotational axis;

a manually operated first button disposed on the base member in proximity to the dial and extending perpendicular to the outer surface of the top cover;

a detent mechanism operatively associated with the dial for providing a detenting force to the dial at a plurality of rotational positions of the dial; and a first electrical contact member operated by the dial for selectively contacting a second electrical contact member when the dial is positioned at each of the plurality of rotational positions.

27. The device according to claim 26 further comprising a manually operated second button disposed on the base member in proximity to the dial and extending perpendicular to the outer surface of the top cover.

28. The device according to claim 26 wherein the first button extends substantially parallel to the rotational axis of the dial.

29. A bicycle control device comprising:

a base member adapted to be mounted to a structural member of a bicycle;

a dial rotatably mounted to the base member;

a detent mechanism operatively associated with the dial for providing a detenting force to the dial at a plurality of rotational positions of the dial;

a first electrical contact member operated by the dial for selectively contacting a second electrical contact member when the dial is positioned at each of the plurality of rotational positions;

a cover, wherein the dial is disposed on an external first side of the cover;

only a single platform disposed on an opposite second side of the cover and connected to the dial for rotation therewith;

a conductive brush disposed on the platform for forming the first electrical contact member; and wherein the first button is disposed below the dial when viewed from a top of the dial.

30. A bicycle control device comprising:

a base member adapted to be mounted to a structural member of a bicycle;

a dial rotatable mounted to the base member;

a detent mechanism operatively associated with the dial for providing a detenting force to the dial at a plurality of rotational positions of the dial;

a first electrical contact member operated by the dial for selectively contacting a second electrical contact member when the dial is positioned at each of the plurality of rotational positions;

a cover, wherein the dial is disposed on an external first side of the cover;

only a single platform disposed on an opposite second side of the cover and connected to the dial for rotation therewith;

a conductive brush disposed on the platform for forming the first electrical contact member; and a display disposed in close proximity to the dial for displaying alphanumeric information.

31. The device according to claim 30 wherein the display is disposed on a lateral side of the dial.

32. The device according to claim 30 wherein the first button is disposed below the dial when viewed from a top of the dial.

33. The device according to claim 32 wherein the display is disposed on a lateral side of the dial.

34. The device according to claim 26 wherein an entire upper surface of the dial is substantially flat.

35. The device according to claim 26 wherein the upper peripheral surface has an annular shape.

36. The device according to claim 35 wherein the upper peripheral surface has a free circular outer edge.

37. A bicycle control device comprising:

a base member adapted to be mounted to a structural member of a bicycle;

a dial mounted to the base member for rotation around a rotational axis;

wherein the dial has an upper peripheral surface surrounding the rotational axis so that the dial is operated by contacting the upper peripheral surface with a thumb and sweeping the upper peripheral surface contacted by the thumb around the rotational axis so that the upper peripheral surface moves around the rotational axis;

a detent mechanism operatively associated with the dial for providing a detenting force to the dial at a plurality of rotational positions of the dial;

a first electrical contact member operated by the dial for selectively contacting a second electrical contact member when the dial is positioned at each of the plurality of rotational positions;

a cover, wherein the dial is disposed on an external first side of the cover;

a platform disposed immediately adjacent to an opposite second side of the cover and connected to the dial for rotation therewith; and a conductive brush disposed on the platform for forming the first electrical contact member.

38. The device according to claim 37 wherein an entire upper surface of the dial is substantially flat.

39. The device according to claim 37 wherein the upper peripheral surface has an annular shape.

40. The device according to claim 39 wherein the upper peripheral surface has a free circular outer edge.

41. A bicycle control device comprising:

a base member adapted to be mounted to a structural member of a bicycle;

a dial mounted to the base member for rotation around a rotational axis;

wherein the dial has an upper peripheral surface surrounding the rotational axis so that the dial is operated by contacting the upper peripheral surface with a thumb and sweeping the upper peripheral surface contacted by the thumb around the rotational axis so that the upper peripheral surface moves around the rotational axis;

a detent mechanism operatively associated with the dial for providing a detenting force to the dial at a plurality of rotational positions of the dial;

a first electrical contact member operated by the dial for selectively contacting a second electrical contact member when the dial is positioned at each of the plurality of rotational positions;

a cover, wherein the dial is disposed on an external first side of the cover;

a platform disposed on an opposite second side of the cover and connected to the dial for rotation therewith, wherein the detent mechanism is disposed on the platform; and a conductive brush disposed on the platform for forming the first electrical contact member.

42. The device according to claim 41 wherein the cover includes a plurality of concave components, wherein the platform includes a convex component for engaging the plurality of concave components, and wherein the convex component and the plurality of concave components form the detent mechanism.

43. The device according to claim 41 wherein an entire upper surface of the dial is substantially flat.

44. The device according to claim 41 wherein the upper peripheral surface has an annular shape.

45. The device according to claim 44 wherein the upper peripheral surface has a free circular outer edge.

46. A bicycle control device comprising:

a base member adapted to be mounted to a structural member of a bicycle;

a dial rotatably mounted to the base member so that the dial rotates around an axis substantially perpendicular to an outer surface of the base member, and so that the dial at least partially overlaps the structural member when viewed from a top of the dial along the axis;

wherein no portion of the dial extends laterally outside the base member when viewed from a top of the dial along the axis;

a detent mechanism operatively associated with the dial for providing a detenting force to the dial at a plurality of rotational positions of the dial; and a first electrical contact member operated by the dial for selectively contacting a second electrical contact member when the dial is positioned at each of the plurality of rotational positions.

47. The device according to claim 46 wherein an entire upper surface of the dial is substantially flat.

48. The device according to claim 46 wherein the upper peripheral surface has an annular shape.

49. The device according to claim 46 wherein the upper peripheral surface has a free circular outer edge.

50. The device according to claim 46 wherein at least a portion of the dial is disposed in a recessed portion of the base member.

51. A bicycle control device comprising:

a base member adapted to be mounted to a structural member of a bicycle;

a dial rotatably mounted to the base member so that the dial rotates around an axis substantially perpendicular to an outer surface of the base member, and so that the dial at least partially overlaps the structural member when viewed from a top of the dial along the axis;

wherein at least a portion of the dial is disposed in a recessed portion of the base member;

a detent mechanism operatively associated with the dial for providing a detenting force to the dial at a plurality of rotational positions of the dial; and a first electrical contact member operated by the dial for selectively contacting a second electrical contact member when the dial is positioned at each of the plurality of rotational positions.

52. The device according to claim 51 wherein an entire upper surface of the dial is substantially flat.

53. The device according to claim 51 wherein the upper peripheral surface has an annular shape.

54. The device according to claim 51 wherein the upper peripheral surface has a free circular outer edge.

* * * * *